May 16, 1933.  L. S. GUNDERMAN  1,909,859
PEDAL CONTROL ATTACHMENT FOR MOTOR VEHICLES
Filed March 11, 1929
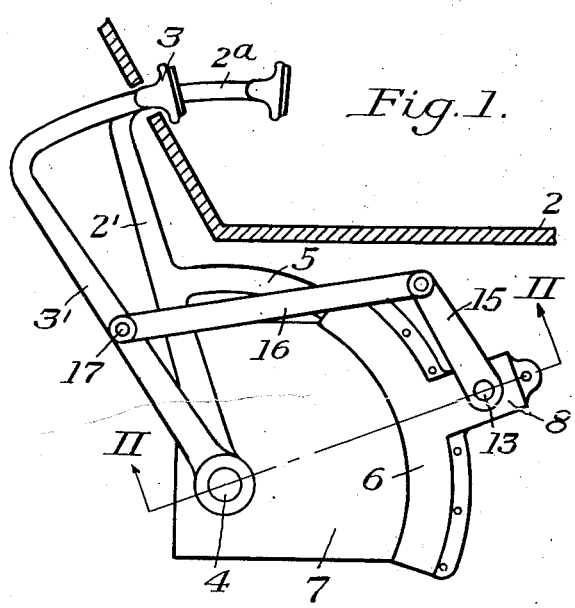
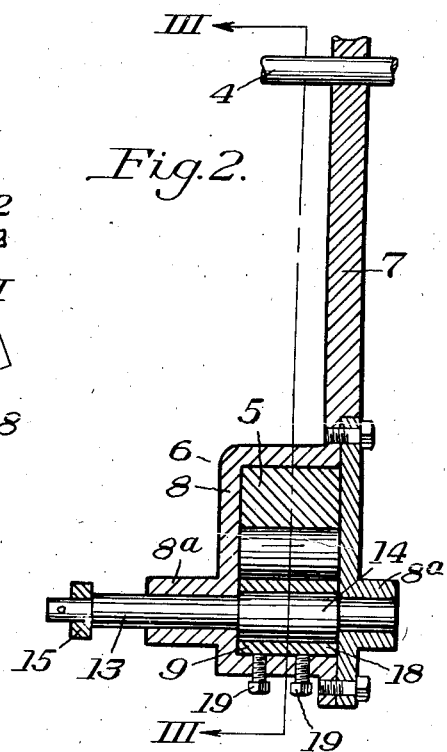
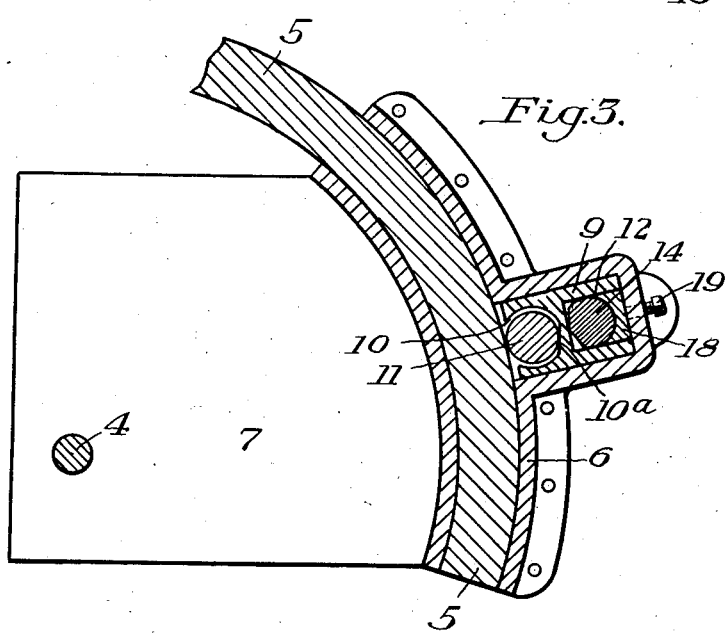
Inventor
Lester S. Gunderman
by his attorneys
Byrnes, Stebbins, Parmelee Patented May 16, 1933

1,909,859

UNITED STATES PATENT OFFICE

LESTER S. GUNDERMAN, OF PITTSBURGH, PENNSYLVANIA, ASSIGNOR TO WAGNER ELECTRIC CORPORATION, OF ST. LOUIS, MISSOURI, A CORPORATION OF DELAWARE

PEDAL CONTROL ATTACHMENT FOR MOTOR VEHICLES

Application filed March 11, 1929. Serial No. 345,950.

This invention relates to motor vehicles, and is for an attachment adapted to be connected with the clutch and brake mechanisms of a motor vehicle for controlling the movement of one mechanism to a certain extent, from the movement of the other mechanism. The invention constitutes an improvement on the device disclosed in my Patent No. 1,657,356, dated January 24, 1928.

As pointed out in my said patent, the clutch and brake pedals of an automobile are ordinarily arranged one beside the other. Pushing down on the clutch pedal disengages the clutch, and pushing down on the brake pedal applies the brakes. In driving an automobile, the brake is often operated without operating the clutch, and the clutch is often operated without movement of the brake pedal. In coming to a full stop, both pedals are usually depressed simultaneously.

The accelerator pedal is usually arranged close to the brake pedal. If the car is brought to a stop on an uphill grade, it is of course necessary to speed up the engine before releasing the brake and before letting the clutch pedal out. This can only be done by speeding up the engine with the hand control on the steering column, or by applying the emergency brake and releasing the foot brake. If the operator's foot is taken off the brake pedal to operate the accelerator, the car starts to roll backwards. If the clutch is released, without speeding up the engine and with the brake applied, the engine is likely to be stalled.

According to the present invention, there is provided a device which will not interfere with the separate operations of the pedals, so that it affords no impediment to driving, but which, when both the pedals are simultaneously depressed will function in such a way that the brake is gradually released as the clutch is being brought into operative position, whereby the operator is free to use his foot on the accelerator, and the car can be smoothly started without jerking. This result can be acquired with the mechanism disclosed in my said patent, but the present invention is for a more simple mechanism in which the use of a fluid or a fluid pressure cylinder is not required.

The invention may be readily understood by reference to the accompanying drawing which illustrates one embodiment of my invention and in which Figure 1 is a side elevation of my invention and the portions of the clutch and brake mechanisms to which it is especially applicable;

Figure 2 is a transverse horizontal section in the plane of line II—II of Figure 1; and Figure 3 is a longitudinal section in the plane of line III—III of Figure 2.

In the drawing I have shown only so much of a motor vehicle and the brake and clutch mechanisms as is necessary to illustrate my invention, and it will be understood that the clutch and brake mechanisms are of any of the usual or preferred types functioning in the usual way.

In the drawing, 2 designates the floor of a motor vehicle. Operable through the floor is a pedal 2a of the foot brake mechanism. Beside the foot brake pedal is a pedal 3 for operating the clutch mechanism of the vehicle. Both the pedals 2a and 3 operate about a shaft 4 as their center, the brake pedal having a shank 2' and the clutch pedal having a shank portion 3'.

Projecting from the shank portion 2' of the brake pedal is an arcuately curved extension 5. This extension projects into and is adapted to operate in a closed guideway 6 on a fixed supporting plate 7.

Projecting laterally from the guideway 6 is an offset 8 in which is a slidable block 9. On the inner end of the block 9 is a cavity 10 in which is received a roller 11 of less diameter than the diameter of the cavity, so that the roller is ordinarily loose in the cavity. This roller is adapted to contact with the arcuate extension 5 on the brake pedal. In the back face of the cavity 10 is a slightly inclined wall portion 10a.

The other end of the sliding block 9 is slotted or bifurcated to provide a slot 12. Passing through the offset portion 8, and carried in bearings 8a on such offset portion is a shaft 13 having an eccentric cam portion 14 engaging in the slot 12 of the slidable block 9.

On the end of the shaft 13 is an arm 15. A link 16 is pivotally connected to the arm 15, and the other end of the link is connected to the shank of the clutch pedal at 17.

When the clutch pedal 3 is depressed, motion is transmitted through the link 16 and the arm 15 to rotate the shaft 13. When the shaft 13 rotates, the cam or eccentric portion 14 drives the sliding block 9 to the left, as viewed in Figure 3, tending to hold the roller 11 tightly against the curved extension 5 on the brake pedal. When the brake pedal is pushed down, the extension 5 of course moves upwardly, as viewed in Figure 3, tending to lift the roller 11 into the wider upper part of the cavity 10 so that the roller offers no resistance to the movement of the brake pedal to braking position. While the clutch remains depressed, however, any movement of the brake pedal toward brake releasing position tends to force the roller 11 into the narrower portion of the cavity and wedge the roller against the curved extension 5, thereby preventing the brake from releasing.

After the clutch pedal has been allowed to come back, the block 9 is free to move back a slight distance to a position where the roller 11 is no longer effective for locking the brake mechanism against movement and the brake can release itself. The mechanism provides in effect a dog or detent under the control of the clutch which permits the brakes to be applied but holds the brakes from releasing until the clutch pedal has moved at least part way out. The arrangement is preferably such that the brake can release just as the clutch engages so that the car will have no opportunity to roll backwards. Since the releasing movement of the brake is controlled entirely by the clutch mechanism, the operator is free to take his foot off the brake pedal and use it on the accelerator.

The mechanism is extremely simple, and it will be seen that it affords no impediment to the independent operation of the clutch and brake mechanisms. As long as the clutch pedal is out, the brake pedal can operate freely. The attachment functions only when the brake pedal is depressed at the time the clutch pedal is depressed or while the clutch pedal is depressed.

In order to support the shaft 13 between the bearings 8a, a bearing block 18 is preferably provided at the rear of the offset portion 8. This bearing block 18 may be adjusted by means of set screws 19 in order to take up any slight wear that develops. It will be understood that the movement of the block 9 need be only very slight in order to effect the desired results. Consequently the cam 14 is designed to give only a very slight movement, and it is desirable to have the bearing 18 adjustable in order to eliminate any slight lost motion which may develop.

While I have illustrated and described one specific form of attachment for the clutch and brake mechanisms, it will be understood that the invention is not restricted to the particular construction and arrangement shown, but may be variously modified within the contemplation of the invention and under the scope of the following claims.

I claim:

1. In a mechanism of the class described, a clutch pedal, a brake pedal having an extension thereon of substantially uniform cross-sectional area throughout the operating portion thereof, a guideway in which the extension operates, a wedging mechanism comprising a movable carrier having a relatively movable friction element therein associated with the guideway and movable relatively to said extension into and out of operable position and adapted when in operable position to engage said extension and prevent movement thereof in one direction only, and means connected with the clutch pedal for effecting movement of said wedging mechanism into and out of operative position.

2. In an apparatus of the class described, a clutch pedal, a brake pedal, an extension on the brake pedal, a guide through which the extension passes, a slide block positioned along the guide and movable transversely to the direction of movement of the extension, a roller in one end of the slide block adapted to contact with the extension, said slide block having a wedge shaped cavity to receive the roller, and means connected with the clutch pedal for moving said block toward and away from the extension.

3. In an apparatus of the class described, a clutch pedal, a brake pedal, an extension on the brake pedal, a guide through which the extension passes, a slide block positioned along the guide and movable transversely to the direction of movement of the extension, a roller in one end of the slide block adapted to contact with the extension, said slide block having a wedge shaped cavity to receive the roller, and means connected with the clutch pedal for moving said block toward and away from the extension, said means including a shaft having a cam thereon which cam is adapted to bear against the block.

4. In an apparatus of the class described, a clutch pedal, a brake pedal, an extension on the brake pedal, a guide through which the extension passes, a slide block positioned along the guide and movable transversely to the direction of movement of the extension, a roller in one end of the slide block adapted to contact with the extension, said slide block having a wedge shaped cavity to receive the roller, means connected with the clutch pedal for moving said block toward and away from the extension, said means including a shaft having a cam thereon which cam is adapted to bear against the block, and an adjustable bearing in said shaft.

5. In an apparatus of the class described, a clutch pedal, a brake pedal, a curved extension on the brake pedal, a supporting plate having a guideway thereon to receive said extension, a roller type of wedging mechanism arranged along the guide for cooperation with the extension, and means connected with the clutch pedal for moving said wedging mechanism into and out of operative position.

6. A locking mechanism of the class described, comprising a member movable upon actuation of a brake mechanism, a floating wedge member movable into and out of locking engagement with said first member, a movable carrier for confining the floating wedge member and adapted to confine the floating wedge in engagement with said first member when said carrier is moved in one direction, the floating wedge being free when said carrier is moved in the other direction, and a clutch actuated mechanism for controlling the movement of said carrier.

7. A locking mechanism of the class described, comprising a member movable upon actuation of a brake mechanism, a carrier member movable toward and away from said member, a wedge element confined in the carrier and adapted to be confined upon movement of the carrier toward said member in wedging engagement with said member, and a clutch actuated mechanism for controlling the movement of said carrier.

8. A locking mechanism of the class described, comprising a member movable upon actuation of a brake mechanism, a carrier movable toward and away from said member, a wedge element confined in the carrier and adapted to be confined upon movement of the carrier toward said member in wedging engagement with said member, and a clutch actuated mechanism for controlling the movement of said carrier, said wedge comprising a roller which is loosely contained in the carrier, said carrier having an inclined face for camming the roller into wedging engagement with said first member.

9. A locking mechanism of the class described, comprising a member movable upon actuation of a brake mechanism, a carrier movable toward and away from said member, a wedge element confined in the carrier and adapted to be confined upon movement of the carrier toward said member in wedging engagement with said member, and a clutch actuated mechanism for controlling the movement of said carrier, said wedge comprising a roller which is loosely contained in the carrier, said carrier having an inclined face for camming the roller into wedging engagement with said first member, said clutch actuated mechanism including a rotating cam operatively engaging the carrier.

In testimony whereof I have hereunto set my hand.

LESTER S. GUNDERMAN.